(12) United States Patent
Yagasaki et al.

(10) Patent No.: US 8,628,230 B2
(45) Date of Patent: Jan. 14, 2014

(54) REFLECTING STRUCTURE, LIGHT-SCATTERING MEMBER, LIGHT-GUIDING PLATE AND LIGHTING DEVICE

(75) Inventors: Shinji Yagasaki, Musashimurayama (JP); Sho Shinji, Hachioji (JP)

(73) Assignee: Olympus Corporation, Tokyo (JP)

( * ) Notice: Subject to any disclaimer, the term of this patent is extended or adjusted under 35 U.S.C. 154(b) by 198 days.

(21) Appl. No.: 12/928,087

(22) Filed: Dec. 3, 2010

(65) Prior Publication Data
US 2012/0140522 A1 Jun. 7, 2012

(51) Int. Cl.
*F21V 7/04* (2006.01)

(52) U.S. Cl.
USPC .......................... 362/617; 362/615

(58) Field of Classification Search
USPC .................. 362/615–629; 349/62–63, 65
See application file for complete search history.

(56) References Cited

U.S. PATENT DOCUMENTS

| | | | |
|---|---|---|---|
| 5,718,497 A * | 2/1998 | Yokoyama et al. | 362/625 |
| 7,018,088 B2 * | 3/2006 | Yu et al. | 362/620 |
| 7,311,433 B2 * | 12/2007 | Chen et al. | 362/617 |
| 7,563,013 B2 * | 7/2009 | Lin et al. | 362/620 |
| 8,162,526 B2 * | 4/2012 | Erchak et al. | 362/612 |
| 2011/0292321 A1 * | 12/2011 | Travis et al. | 349/65 |

FOREIGN PATENT DOCUMENTS

| | | |
|---|---|---|
| JP | 07-056022 | 3/1995 |
| JP | 09-230339 | 9/1997 |
| JP | 2002-133907 | 5/2002 |
| JP | 2005-158506 | 6/2005 |
| JP | 2005-249882 | 9/2005 |
| JP | 2005-285724 | 10/2005 |
| JP | 2005-301016 | 10/2005 |
| JP | 2006-302569 | 11/2006 |
| JP | 2009-117304 | 5/2009 |

OTHER PUBLICATIONS

Japanese Office Action, dated Jun. 11, 2013, issued in corresponding Japanese Patent Application No. 2009-146386.

* cited by examiner

*Primary Examiner* — Robert May
(74) *Attorney, Agent, or Firm* — Kenyon & Kenyon LLP (57) ABSTRACT

A reflecting structure is provided with a first surface having two side-end portions opposing each other and a plurality of light scatterers, each scattering light, formed on the first surface. In a section perpendicular to an axis located on the first surface between the two side-end portions, the height of each of the light scatterers from the first surface gets smaller from the axis toward the side-end portion.

14 Claims, 8 Drawing Sheets

REFLECTING STRUCTURE, LIGHT-SCATTERING MEMBER, LIGHT-GUIDING PLATE AND LIGHTING DEVICE

FIELD OF THE INVENTION

The present invention relates to a reflecting structure, a light-scattering member, a light-guiding plate, and a lighting device.

BACKGROUND OF THE INVENTION

JP2005-249882A discloses a prior-art technology in that a light-guiding plate for back light of a liquid crystal display device is provided with semispherical scatterers at least on one face.

SUMMARY OF THE INVENTION

A reflecting structure according to an embodiment of the present invention is provided with a first surface having two side-end portions opposing each other and a plurality of light scatterers, each scattering light, formed on the first surface. In relation to a section perpendicular to an axis located on the first surface between the two side-end portions, the height of each of the light scatterers from the first surface gets smaller from the axis toward the side-end portion.

DESCRIPTION OF THE PREFERRED EMBODIMENTS

First Embodiment

Figure 1:
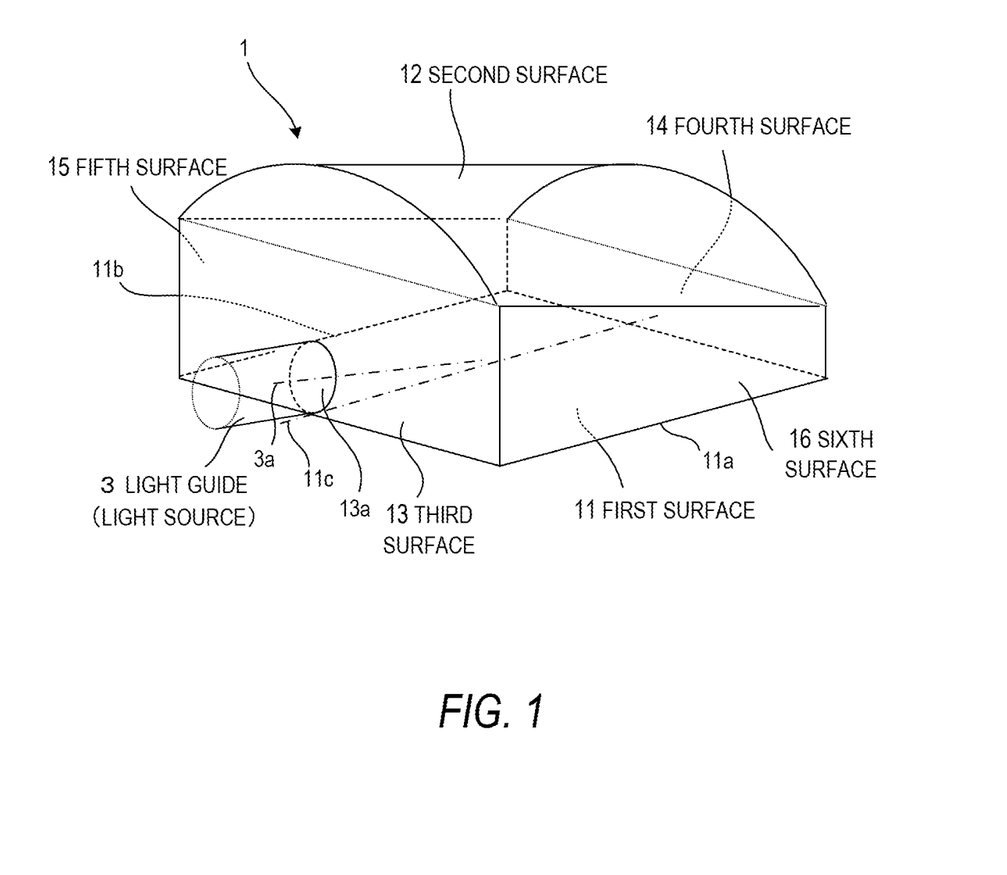
FIG. 1 is an outline perspective view of a light-guiding plate.

Referring to FIG. 1, a light-guiding plate according to a first embodiment will be described. This light-guiding plate is used as a lighting device of an endoscope, but not limited to that.

Light from a light source is introduced into a light-guiding plate 1 through a light guide 3 such as an optical fiber bundle or the like. The light-guiding plate 1, the light guide 3, and the light source constitute a lighting device. It is only necessary that a material of the light-guiding plate 1 is a transparent member such as a transparent resin material or a resin material having transparency, for example, and it may be a polycarbonate material or acrylic resin. Also, the material of the light-guiding plate 1 may be glass.

The light-guiding plate 1 has, as shown in FIGS. 2A to 2E, respectively, a first surface 11, a second surface 12, a third surface 13, a fourth surface 14, a fifth surface 15, and a sixth surface 16. The first surface 11 opposes the second surface 12, the third surface 13 opposes the fourth surface 14, and the fifth surface 15 opposes the sixth surface 16. The third surface 13, the fourth surface 14, the fifth surface 15, and the sixth surface 16 are located between the first surface 11 and the second surface 12.

Figure 2A:
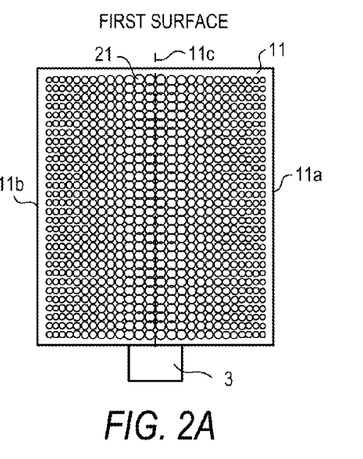
FIG. 2A is a bottom view illustrating a first surface of the light-guiding plate.
Figure 2B:
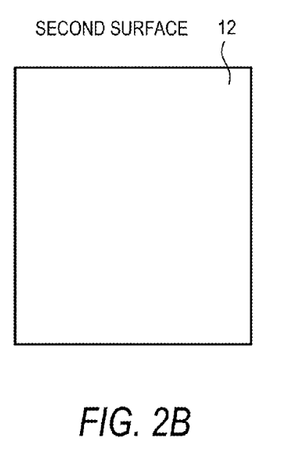
FIG. 2B is an end face view illustrating a second surface of the light-guiding plate.

In the first surface 11 of the light-guiding plate 1 (FIG. 2A), a plurality of light scatterers 21 that scatter light introduced into the light-guiding plate 1 are formed. The plurality of light scatterers 21 of the first surface 11 constitute a reflecting structure. As a result, incident light incident to the light-guiding plate 1 can be scattered by the first surface 11, and the light can be emitted in a wide range into the air from the second surface 12 opposing the first surface 11. For example, as shown in FIG. 2A, the plurality of light scatterers 21 are arranged in a square lattice with a substantially uniform density.

The second surface 12 (FIG. 2B) is a transmission surface that transmits the light. The second surface 12 is a semi-cylindrical (or cylindrical) curved surface. Thus, the light going toward the second surface with a large angle so as to illuminate a wide range is prevented from undergoing total internal reflection on the second surface. The semi-cylindrical curved surface is a curved surface portion obtained by cutting a cylinder on a surface parallel with its rotation symmetric axis. As in FIG. 2F, the second surface 12 can be simply formed in a roof shape.

Figure 2C:
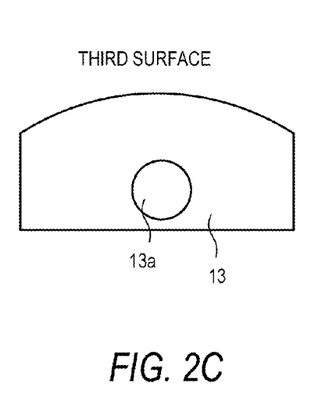
FIG. 2C is a front view illustrating a third surface of the light-guiding plate.
Figure 2D:
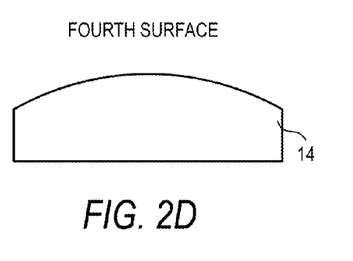
FIG. 2D is a rear view illustrating a fourth surface of the light-guiding plate.

An outlet end face of the light guide 3 is located on the third surface 13 (FIG. 2C). In the third surface 13, at least a part corresponding to the outlet end face of the light guide 3 is a transmission surface 13a that transmits the light. In FIG. 1, the transmission surface 13a is located on the first surface 11 side in the vicinity of the center part in the longitudinal direction of the third surface 13, but not limited to that. The light guide 3 constitutes light incident means (light incident part) arranged opposite to the transmission surface 13a of the third surface 13.

The fourth surface 14 (FIG. 2D) has the same shape as the third surface 13, but in the fourth surface 14, a separation distance (height) between the first surface 11 and the second surface 12 is smaller than that of the third surface 13.

The fourth surface 14, the fifth surface 15, and the sixth surface 16 are all reflective surfaces. The fourth surface 14, the fifth surface 15, and the sixth surface 16 extend to the same side with respect to the first surface 11 from three sides which define the first surface 11. By surrounding the light-guiding plate 1 by the reflective surfaces as above, light can be emitted from a desired direction (second surface 12). Also, since the surfaces excluding the third surface 13 (light incoming part) and the second surface 12 are reflective surfaces, light emission efficiency of the light emitted from the second surface 12 is improved. The light emission efficiency is a ratio between a light amount entering the light-guiding plate 1 per unit time and a light amount emitted from the light-guiding plate 1 per unit time.

Figure 2E:
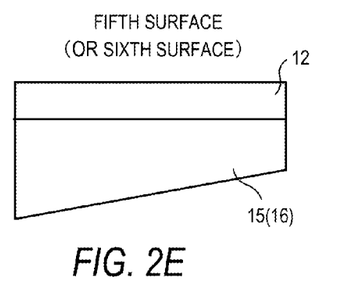
FIG. 2E is a side view illustrating a fifth surface or a sixth surface of the light-guiding plate.
Figure 2F:
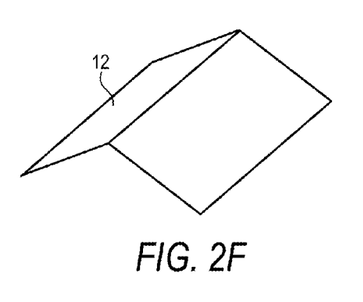
FIG. 2F is a perspective view illustrating another example of the shape of the second surface.

Also, since the fifth surface 15 (sixth surface 16) has the shape as in FIG. 2E, the separation distance between the first surface 11 and the second surface 12 gets smaller from the third surface 13 toward the fourth surface 14. This is a measure against difficulty in reaching of the incident light as going away from the third surface 13. As a result, the first surface 11 is inclined with respect to an optical axis 3a of the incident light, a probability that the incident light collides against the reflecting structure of the first surface 11 is improved even in the vicinity of the fourth surface 14, and the light emission efficiency is raised.

Subsequently, referring to FIGS. 3A and 3B, a configuration of the reflecting structure of the first surface 11 will be described in detail.

The light scatterer 21 of the reflecting structure has a refractive index different from that of the material having transparency or permeability of the light-guiding plate 1 and scatters or reflects light. The light scatterer 21 may be a recess (or a groove) formed in the first surface 11. In this case, since the material of the light-guiding plate 1 and air in the recess have different refractive indexes, the light can be scattered. If the material of the light-guiding plate 1 is a resin material, formation of the plurality of light scatterers 21 as recesses becomes facilitated. Alternatively, the light scatterer 21 may be a material having a refractive index different from the material of the light-guiding plate 1 and embedded in the first surface 11.

Figure 3A:
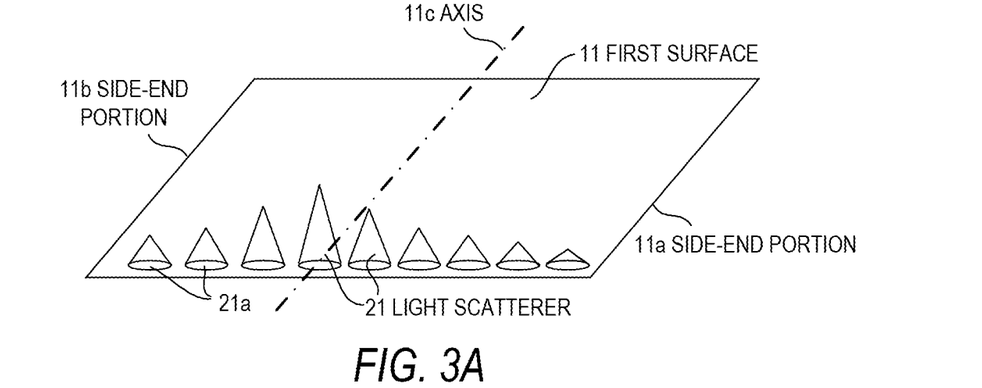
FIG. 3A is a diagram partially exemplifying a reflecting structure of the first surface.
Figure 3B:
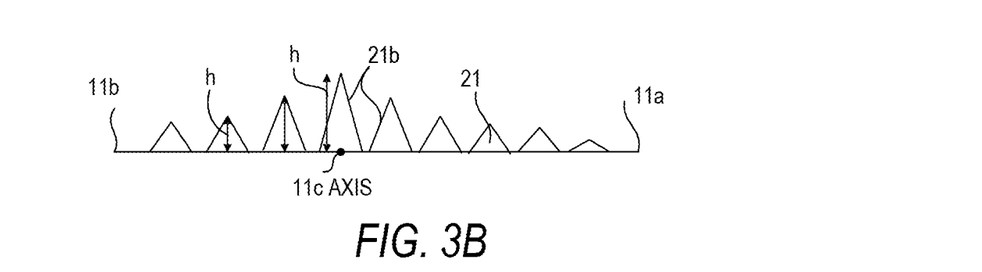
FIG. 3B is a sectional view illustrating a change in the height of a light scatterer in the reflecting structure.

The light scatterer 21 can take various shapes but in this embodiment, a case in which the light scatterer 21 has a substantially conical shape as in FIG. 3A will be particularly described. For example, a bottom part 21a (in the first surface) of each light scatterer 21 has a circular shape having a substantially same diameter, but not limited to that. The part of the first surface 11 other than the light scatterer 21 is preferably a reflective surface.

The first surface 11 has two side-end portions 11a and 11b opposing each other. An axis 11c is set so as to be located at the center part between the two side-end portions 11a and 11b in the first surface 11 or the vicinity thereof. The axis 11c may be substantially parallel with the side-end portions 11a and 11b. As in FIG. 3B, in a section perpendicular to the axis 11c, a height h from the first surface 11 of the light scatterer 21 gradually gets smaller from the axis 11c toward the one side-end portion 11a and also gradually gets smaller from the axis 11 also toward the other side-end portion 11b. As a result, the high light scatterer is arranged near the center of the light-guiding plate 1, and the heights of the light scatterers become lower as getting closer to the side-end portions 11a and 11b. The light scattered by the high light scatterer at the center can easily reach the side-end portions. Therefore, the light amount reaching the respective light scatterers to the side-end portions is increased, and light emission efficiency of the light-guiding plate 1 is increased.

The axis 11c may be set as one obtained by perpendicularly projecting the optical axis 3a of the incident light incident to the light-guiding plate 1 from the light guide 3 on the first surface 11. As a result, a light diffusion effect by the light scatterer in the vicinity of the optical axis of the incident light is improved, and moreover, the light amount reaching the side-end portions is increased. Also, the transmission surface 13a of the third surface is located in the vicinity of an intersection between the axis 11c and the third surface 13. By making the light enter from the vicinity of the axis 11c where light diffusion effect is larger because the light scatterer 21 is larger, the light can be effectively scattered. If the light is made to enter from the transmission surface 13a slightly displaced to the one side-end portion side with respect to the axis 11c, an emission rate of the light in the displaced direction is increased.

Figure 3C:
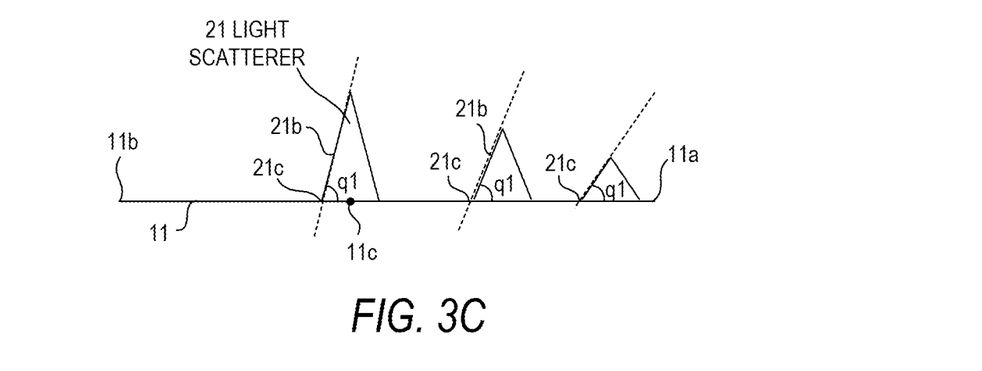
FIG. 3C is a sectional view illustrating a form of a side face of the light scatterer.

As in FIG. 3C, as for the section perpendicular to the axis 11c, at a point 21c on the axis side in contact points between a side face 21b of each light scatterer 21 and the first surface 11, an angle formed by a tangent line of the side face 21b of the light scatterer and the first surface 11 is supposed to be θ1. In this case, the angle θ1 may get gradually smaller from the axis 11c toward the side-end portions 11a and 11b. As a result, a normal direction of the side face 21b of the light scatterer 21 is gradually changed as going away from the axis 11c. Thus, light reflection (scattering) is generated in various directions from the plurality of light scatterers 21, and the light emitting angle from the second surface 12, which is an emitting surface, can be made wide.

Figure 3D:
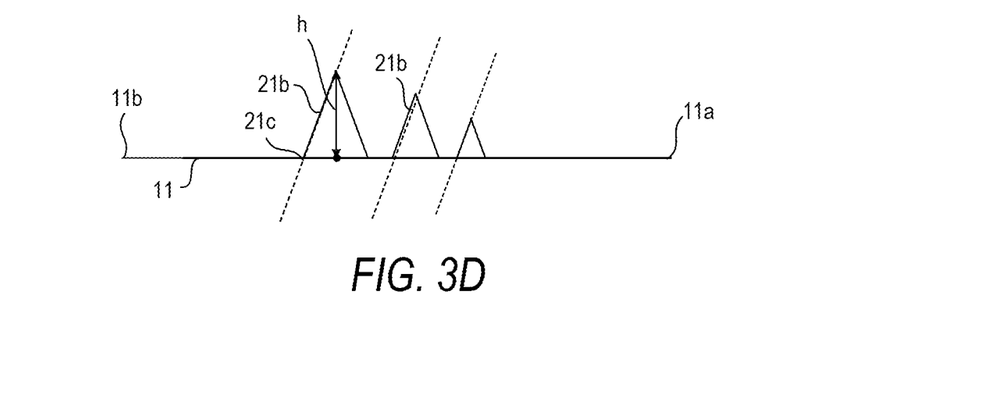
FIG. 3D is a sectional view illustrating another form of the side face of the light scatterer.

As in FIG. 3D, the angle θ1 may be made constant. In this case, the shape of each light scatterer 21 can be made the same in manufacture, and working is facilitated. For example, the light scatterer 21 can be made by simple working as a recess in the same shape in a resin material.

Figure 4A:
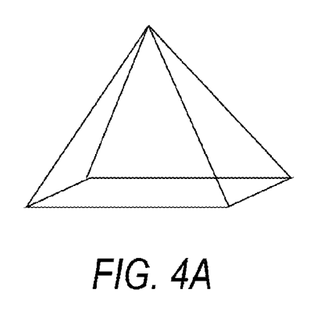
FIG. 4A is a perspective view illustrating the light scatterer in the shape of a square pyramid.
Figure 4B:
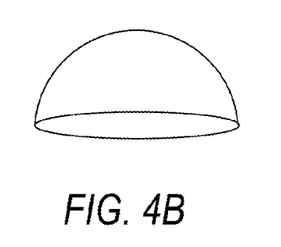
FIG. 4B is a perspective view illustrating the light scatterer in the semispherical shape.
Figure 4C:
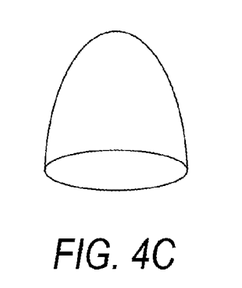
FIG. 4C is a perspective view illustrating the light scatterer in the semielliptical shape.
Figure 5A:
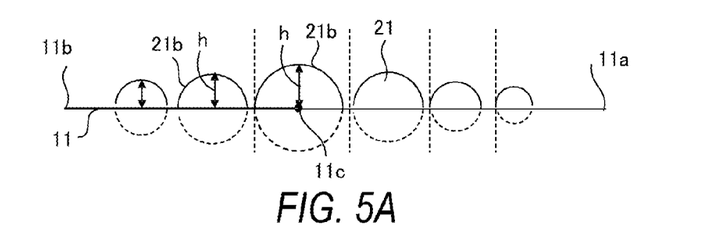
FIG. 5A is a sectional view illustrating a change in the height of the light scatterer if the light scatterer is in the semispherical shape.
Figure 5B:
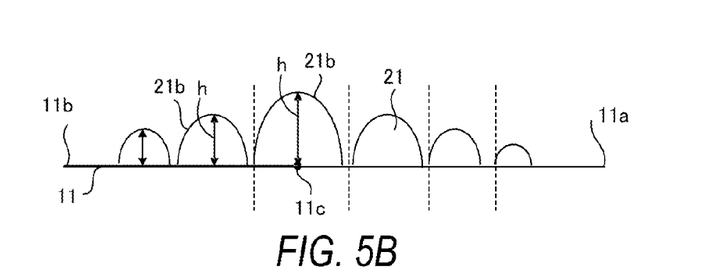
FIG. 5B is a sectional view illustrating a change in the height of the light scatterer if the light scatterer is in the semielliptical shape.

As other shapes of the light scatterer 21, as in FIGS. 4A to 4C, the shape may be a square pyramid, a hemisphere or a semi-ellipse. FIGS. 5A and 5B exemplify a change in the height of the light scatterer 21 if the light scatterer 21 is in the shape of a hemisphere and a semi-ellipse. In the section perpendicular to the axis 11c, the height h of the light scatterer 21 from the first surface 11 gets gradually smaller from the axis 11c toward the side-end portions 11a and 11b. In FIG. 5A, the radius of the hemisphere gets gradually smaller from the axis 11c toward the side-end portions 11a and 11b, but a ratio h/r between the height h from the first surface 11 and the radius r of the sphere is constant, which is 1. Here, the angle θ formed by the normal direction of the side face 21b of each light scatterer 21 and the normal direction of the first surface 11 is continuously changed on the side face 21b.

Subsequently, an effect of the first embodiment will be described. The incident light incident to the light-guiding plate 1 can be scattered by the reflecting structure formed on the first surface 11 and the light can be emitted in a wide range from the second surface 12 opposing the first surface 11 into the air. The height of the light scatterer 21 from the first surface 11 gets smaller from the axis 11c toward the side-end portions 11a and 11b. Thus, the light amount reaching each light scatterer at the side-end portions is increased, and the light emission efficiency of the light-guiding plate is increased. According to actual simulation, it was confirmed that the light emission efficiency is improved by several % over the prior-art technology. The angle θ1 formed by the tangent line of the light scatterer and the first surface 11 may be made smaller from the axis 11c toward the side-end portions 11a and 11b. In this case, the light emission angle from the second surface 12 (light emitting surface) can be made wider.

The fourth surface 14, the fifth surface 15, and the sixth surface 16 may be all reflective surfaces. In this case, the light can be emitted from the second surface 12, which is the transmission surface. The separation distance between the first surface 11 and the second surface 12 may get smaller from the third surface 13 toward the fourth surface 14. In this case, the first surface 11 is inclined to the optical axis 3a of the incident light, and the incident light collides against the reflecting structure of the first surface 11 up to the vicinity of the fourth surface 14. The second surface 12 may be a semi-cylindrical curved surface. In this case, the light travelling toward the second surface 12 with a large angle so as to illuminate a wide range is prevented from undergoing total internal reflection by the second surface 12. The axis 11c may correspond to one obtained by perpendicularly projecting the optical axis 3a of the light incident from the transmission surface of the third surface 13 on the first surface 11. In this case, the light diffusion effect in the vicinity of the optical axis of the incident light is improved, and moreover, the light amount reaching the side-end portions is increased.

Second Embodiment

Figure 6:
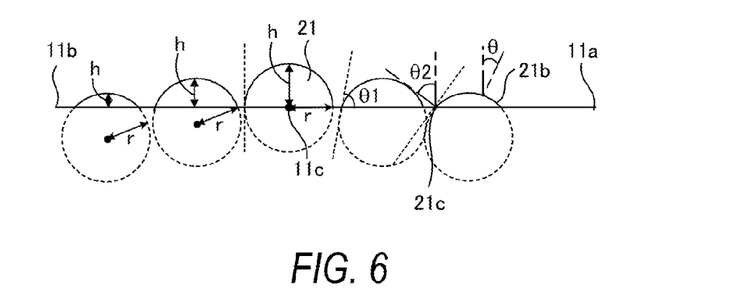
FIG. 6 is a sectional view illustrating a state in which a ratio of the height of the light scatterer to the radius thereof is changed if the light scatterer is a part of a sphere.

In a second embodiment, a case in which the shape of light scatterer is a part of a sphere (radius r) is shown. The other configurations are the same as in the first embodiment. In FIG. 6, θ2 is an angle formed by the normal direction at the contact point 21c between the side face 21b of the light scatterer 21 and the first surface 11 and by the normal direction of the first surface 11.

As in FIG. 6, the ratio h/r between the height h of the light scatterer from the first surface 11 and the radius r of the sphere gets gradually smaller from the axis 11c toward the side-end portions 11a and 11b in the cross section perpendicular to the axis 11c. The angle θ formed by the normal direction of the side face 21b of each light scatterer 21 and the normal direction of the first surface 11 is continuously changed in a range from an angle −θ2 to an angle θ2.

As described above, by arranging the light scatterer 21 having a spherical surface as the side face 21b, the reflecting structure scatters light in a wide range without directivity in the reflection direction. Also, as the value of h/r becomes gradually smaller, the angle θ gets gradually smaller from the axis 11c toward the side-end portions 11a and 11b, and the light is scattered in a wide range.

In this embodiment, the radius r of the sphere is the same value in all the light scatterers 21, while only the height h is changed, but not limited to that, the radius r may be also changed. If the radius r of the sphere is the same value in all the light scatterers 21, because of the uniform spherical shape, formation (mechanical working or the like) of the plurality of light scatterers 21 is facilitated.

Also, similarly to the first embodiment, in the cross section perpendicular to the axis 11c, the height h of the light scatterer 21 from the first surface 11 gets gradually smaller from one axis 11c toward the one side-end portion 11a and also gets gradually smaller from the axis 11c toward the other side-end portion 11b.

As described above, in the second embodiment, as the value of h/r gets gradually smaller, the angle in the normal direction of the side face 21b of the light scatterer 21 gets gradually smaller from the axis 11c toward the side-end portions 11a and 11b, and the light is scattered in a wide range. If the radius r of the sphere of the light scatterer 21 takes the same value in all the light scatterers 21, formation (mechanical working or the like) of the plurality of light scatterers 21 is facilitated.

Third Embodiment

In a third embodiment, a diffraction grating is formed in the third surface 13 and/or the fourth surface 14. The other configurations are the same as in the first embodiment.

Figure 7A:
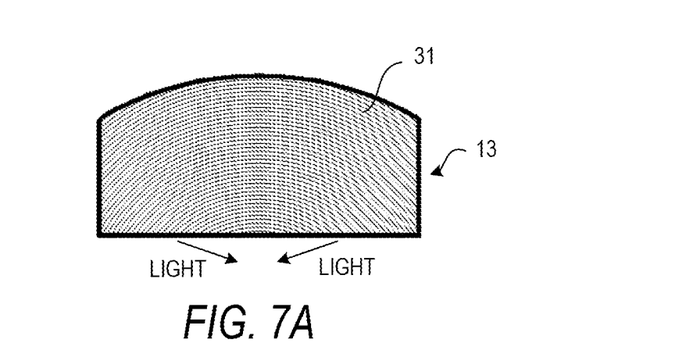
FIG. 7A is a diagram illustrating an example of a diffraction grating pattern of the third surface.
Figure 7B:
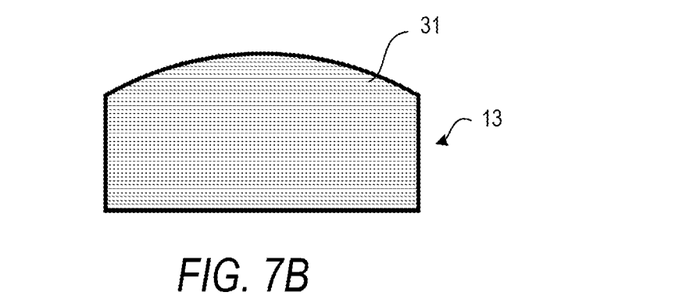
FIG. 7B is a diagram illustrating another example of the diffraction grating pattern of the third surface.
Figure 7C:
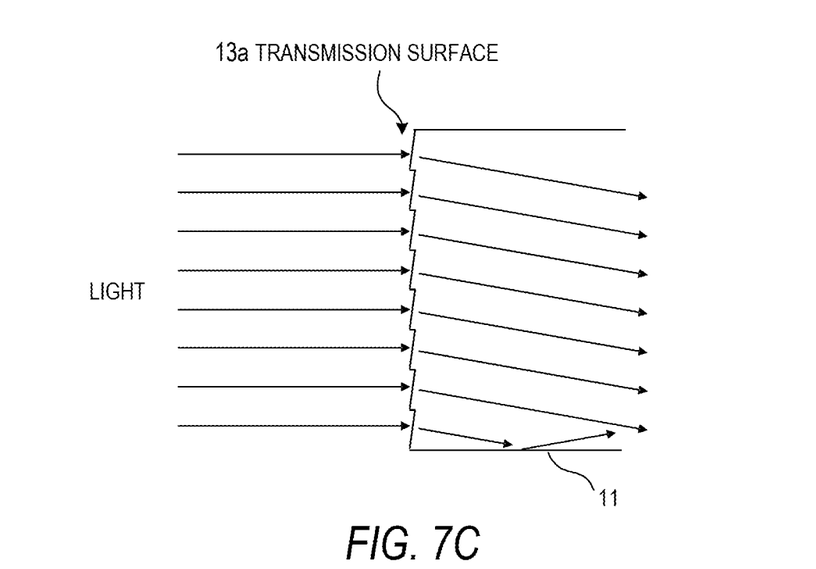
FIG. 7C is a diagram illustrating light passing through the diffraction grating of the third surface.

FIGS. 7A and 7B illustrate patterns (grating patterns) of a diffraction grating 31 of the third surface 13. FIG. 7A shows a concentric grating pattern. FIG. 7B shows a parallel linear grating pattern. These grating patterns collect light toward the first surface 11 as in FIG. 7C.

With the grating pattern in FIG. 7A, the light can be collected to the vicinity of the axis 11c of the first surface 11, whereby the light is made easier to collide against the light scatterer 21 on the first surface 11, and the light emission efficiency is improved. This is because the height h of the light scatterer 21 is high in the vicinity of the axis 11c of the first surface 11. Also, since the light is collected to the vicinity of the axis 11c of the first surface 11, the light enters diagonally to the axis 11c. After that, the light is reflected diagonally with respect to the axis 11c. That is, the light incident from the third surface enters the first surface 11 in a direction crossing the axis 11c and is reflected from the first surface 11, and thus, the light is scattered in a wide range. On the other hand, the grating pattern in FIG. 7B can be formed more easily than the grating pattern in FIG. 7A.

Figure 8A:
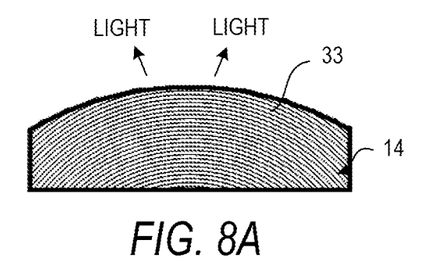
FIG. 8A is a diagram illustrating an example of a diffraction grating pattern of the fourth surface.
Figure 8B:
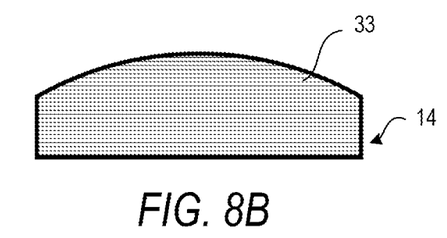
FIG. 8B is a diagram illustrating another example of the diffraction grating pattern of the fourth surface.
Figure 8C:
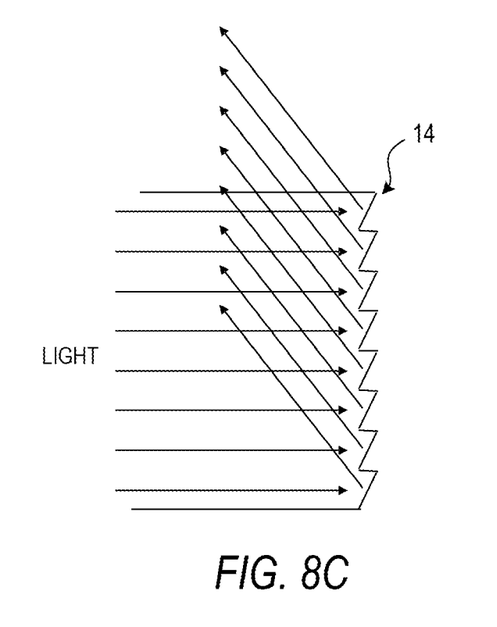
FIG. 8C is a diagram illustrating light from the diffraction grating of the fourth surface.

FIGS. 8A and 8B show patterns (grating patterns) of a diffraction grating 33 of the fourth surface 14. FIG. 8A shows a concentric grating pattern. FIG. 8B shows a parallel linear grating pattern. Since these grating patterns direct the light to the second surface 12 as in FIG. 8C, the light emission efficiency is improved.

With the grating pattern in FIG. 8A, the light can be largely scattered toward the second surface 12. On the other hand, the grating pattern in FIG. 8B can be formed more easily than the grating pattern in FIG. 8A.

In the third embodiment, the light source preferably generates at least one type of monochromatic light so that the light can be easily diffracted.

As described above, in the third embodiment, the diffraction grating 31 is formed on the third surface 13, and since a pattern of the diffraction grating 31 is a pattern that collects light toward the first surface 11, light emission efficiency of the light-guiding plate 1 is improved. The diffraction grating 33 is formed on the fourth surface 14 and since the pattern of the diffraction grating 33 is a pattern that scatters the light toward the second surface 12, the light emission efficiency of the light-guiding plate 1 is improved.

Fourth Embodiment

In a fourth embodiment, distribution of the plurality of light scatterers 21 on the first surface is changed from the first embodiment. The other configurations are the same as in the first embodiment. In the first embodiment, the plurality of light scatterers 21 are arranged in the square lattice with a substantially uniform density as in FIG. 2A.

Figure 9A:
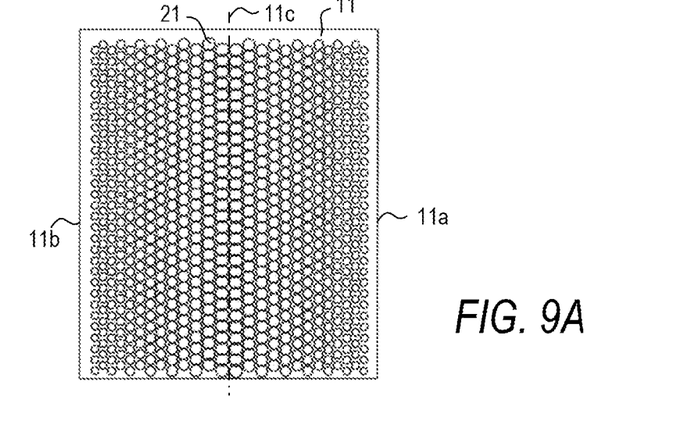
FIG. 9A is a diagram illustrating an example of distribution of the light scatterer of the first surface.
Figure 9B:
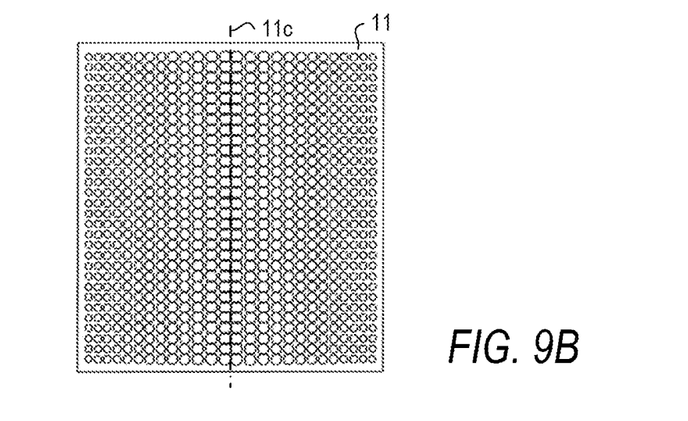
FIG. 9B is a diagram illustrating another example of the distribution of the light scatterer of the first surface.
Figure 9C:
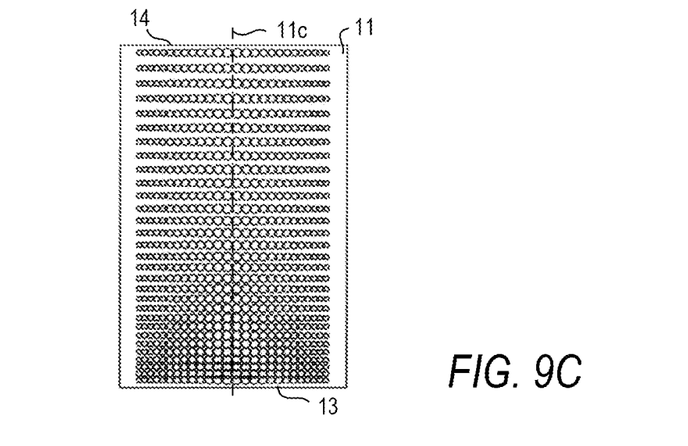
FIG. 9C is a diagram illustrating still another example of the distribution of the light scatterer of the first surface.

In the fourth embodiment, as in FIG. 9A, the rows of the light scatterers 21 may be displaced from each other so that the plurality of light scatterers 21 are arranged in a triangle lattice state. As in FIG. 9B, an interval between the light scatterers 21 (therefore, the density of the light scatterers 21) may be made gradually smaller from the axis 11c toward the side-end portions 11a and 11b. As in FIG. 9C, the interval between the light scatterers 21 (therefore, the density of the light scatterers 21) may be made smaller from the third surface 13 toward the fourth surface 14 side in the direction of the axis 11c.

In the fourth embodiment, the same effect as in the first embodiment can be obtained by the various reflecting structures.

Fifth Embodiment

In a fifth embodiment, the lighting device 5 is configured by combining the plurality of light-guiding plates 1. The other configurations are the same as in the first embodiment.

Figure 10A:
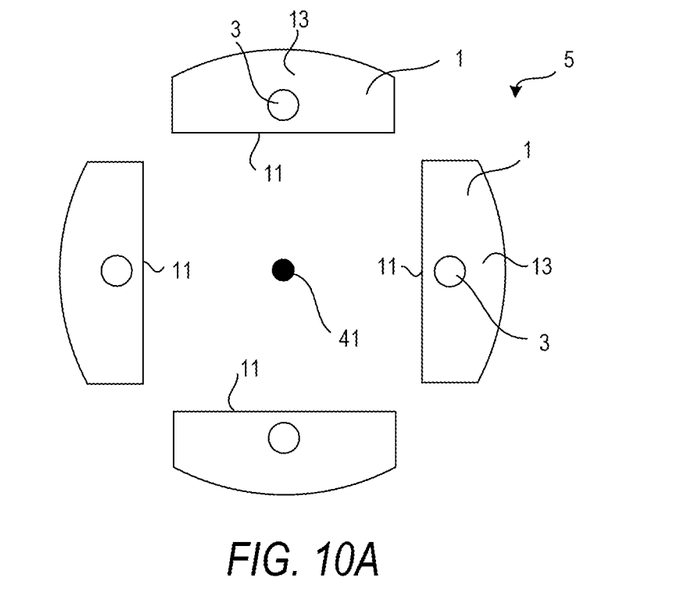
FIG. 10A is a diagram illustrating an example of a configuration of a lighting device.

As in FIG. 10A, in the lighting device 5, the plurality of light-guiding plates 1 are arranged substantially axisymmetrically with respect to an axis 41 around the predetermined axis 41. The first surface 11 of each light-guiding plate 1 is arranged along the axis 41 in parallel with the same. By combining the plurality of light-guiding plates 1, the lighting device can illuminate a wide range uniformly. For example, the number of the light-guiding plates 1 is 4, but not limited to that.

Figure 10B:
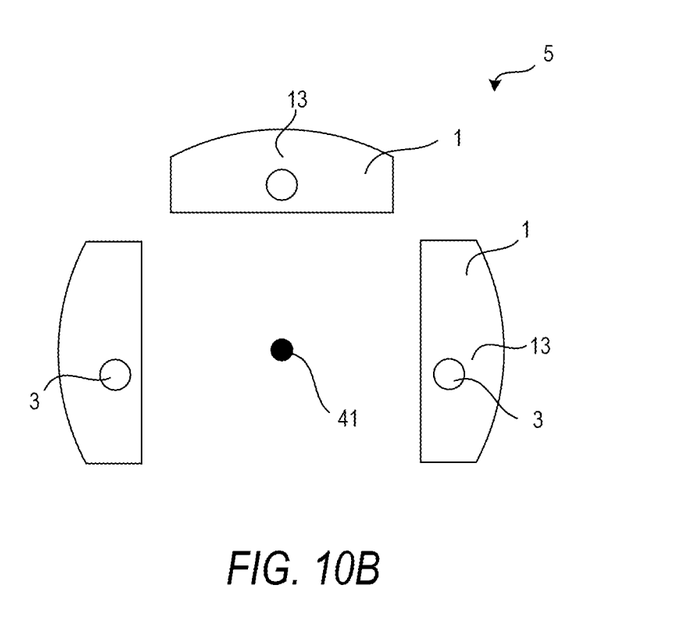
FIG. 10B is a diagram illustrating another example of the configuration of the lighting device.

As in FIG. 10B, the plurality of light-guiding plates 1 may be arranged asymmetrically with respect to the predetermined axis 41. In this case, in some light-guiding plates, the transmission surface 13a of the third surface (that is, the outlet end face of the light guide 3) is displaced to the one side-end portion side with respect to the axis 11c so as to increase the light emission rate to the displaced direction. As a result, if a clearance between the light-guiding plates is large, adjustment can be made so that the light amount emitting toward the side with a larger clearance between the light-guiding plates is increased.

As described above, in the fifth embodiment, the lighting device is provided with at least two or more light-guiding plates, light is made to enter each of the light-guiding plates, and the first surface in each light-guiding plate is arranged along a predetermined axis. Thus, the lighting device can illuminate an angle of a wide range around this predetermined axis.

This invention is not limited to the embodiments described above, and may be subjected to various modifications within the scope of the technical spirit of the invention.

The entire contents of Japanese patent application JP2009-146386, filed with the Japan Patent Office on Jun. 19, 2009, are incorporated into this specification by reference.

What is claimed is:

1. A reflecting structure that scatters or reflects light incident from a lighting means, comprising:
   a first surface;
   a plurality of light scatterers which are formed on the first surface and which scatter or reflect the light,
   the first surface comprising:
      a first side-end portion,
      a second side-end portion opposite to the first side-end portion, and
      an incident-side end portion positioned on an incident-side of the light, the incident-side end portion being connected with an end of the first side-end portion and an end of the second side-end portion;
   a third surface extending from the incident-side end portion positioned on the incident-side of the light, the third surface including a transmission surface that transmits the light incident from the lighting means to the first surface; and
   a first axis defined as an axis which is located on the first surface between the two side-end portions and which passes through a location obtained by perpendicularly projecting the transmission surface of the third surface onto the incident-side end portion,
   wherein in a cross section perpendicular to the first axis, a height of each light scatterer, which is measured from the first surface, gets smaller from the first axis to the side-end portions.

2. The reflecting structure according to claim 1, wherein in the cross section perpendicular to the first axis, an angle formed by a tangent line of each light scatterer and the first surface at a point on a first axis side in contact points between a side face of the each light scatterer and the first surface gets smaller from the first axis toward the side-end portions.

3. The reflecting structure according to claim 1, wherein the shape of the light scatterers is a part of a sphere; and wherein a value of h/r gets smaller from the first axis toward the side-end portions, where a radius of the sphere is r and a height of the sphere is h.

4. The reflecting structure according to claim 3, wherein the radius r of the sphere is the same value for all the light scatterers.

5. A light-scattering member, comprising:
   the reflecting structure according to claim 1; and
   at least three surfaces extending from at least three sides defining the first surface, except for the incident-side end portion, to a same side with respect to the first surface, wherein the at least three surfaces are all reflective surfaces.

6. A light-guiding plate having light permeability, wherein the reflecting structure according to claim 1 is provided on one surface constituting the light-guiding plate.

7. A lighting device, comprising at least two or more of the light-guiding plates according to claim 6,
   wherein light is made to enter each of the light-guiding plates, and the first surface of each light-guiding plate is arranged along a predetermined axis.

8. The light-guiding plate according to claim 6, comprising:
   the reflecting structure according to claim 1, having the first surface;
   a second surface which is a transmission surface that transmits light and opposes the first surface;
   a fourth surface which opposes the third surface and is located between the first surface and the second surface;
   a fifth surface which includes one of the side-end portions; and
   a sixth surface which includes the other of the side-end portions and opposes the fifth surface,
   wherein the third surface includes the incident-side end portion, and the third surface is located between the first surface and the second surface;
   wherein the fourth surface, the fifth surface, and the sixth surface are all reflective surfaces.

9. The light-guiding plate according to claim 8, wherein a separation distance between the first surface and the second surface gets smaller from the third surface toward the fourth surface.

10. The light-guiding plate according to claim 8, wherein a diffraction grating is formed on the fourth surface; and wherein a pattern of the diffraction grating is a pattern that scatters light toward the second surface.

11. The light-guiding plate according to claim 8, wherein a diffraction grating is formed on the third surface; and wherein a pattern of the diffraction grating collects light toward the first surface.

12. A lighting device, comprising:
the light-guiding plate according to claim 8; and
the lighting means arranged opposite to the transmission surface of the third surface.

13. An endoscope comprising the reflecting structure according to claim 1.

14. A light-guiding plate having a reflecting structure, comprising:
a first surface having two side-end portions opposing each other;
a second surface which is a transmission surface that transmits light and opposes the first surface;
a third surface which includes a transmission surface that transmits light and is located between the first surface and the second surface;
a fourth surface which opposes the third surface and is located between the first surface and the second surface;
a fifth surface which includes one of the side-end portions; and
a sixth surface which includes the other of the side-end portions and opposes the fifth surface,
wherein the second surface is a semi-cylindrical curved surface;
wherein the fourth surface, the fifth surface, and the sixth surface are all reflective surfaces;
wherein the reflecting structure comprises a plurality of light scatterers which are formed on the first surface and which scatter light; and
wherein in a cross section perpendicular to an axis located on the first surface between the two side-end portions, a height of each light scatterer, which is measured from the first surface, gets smaller from the axis to the side-end portions.

* * * * *